(12) United States Patent
Hewitt et al.

(10) Patent No.: US 10,929,006 B2
(45) Date of Patent: Feb. 23, 2021

(54) USER INTERFACE FOR RECOMMENDED ALTERNATIVE SEARCH QUERIES

(71) Applicant: International Business Machines Corporation, Armonk, NY (US)

(72) Inventors: Trudy L. Hewitt, Cary, NC (US); Lee A. Jacobson, Byron, MN (US); Luc G. Leblanc, Durham, NC (US); Michael S. Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 536 days.

(21) Appl. No.: 15/669,323

(22) Filed: Aug. 4, 2017

(65) Prior Publication Data
US 2018/0046348 A1 Feb. 15, 2018

Related U.S. Application Data (63) Continuation of application No. 13/936,151, filed on Jul. 6, 2013, now Pat. No. 9,772,765.

(51) Int. Cl.
*G06F 16/00* (2019.01)
*G06F 3/0488* (2013.01)
(Continued)

(52) U.S. Cl.
CPC .......... *G06F 3/0488* (2013.01); *G06F 3/0481* (2013.01); *G06F 3/04842* (2013.01); *G06F 3/04883* (2013.01); *G06F 16/3323* (2019.01)

(58) Field of Classification Search
CPC .. G06F 16/285; G06F 16/217; G06F 16/2428; G06F 16/2465; G06F 16/248; G06F 16/3326; G06F 16/3328; G06F 16/3338; G06F 16/3344; G06F 16/355; G06F 16/3322; G06F 16/334;
(Continued)

(56) References Cited

U.S. PATENT DOCUMENTS 5,642,502 A 6/1997 Driscoll
6,026,388 A 2/2000 Liddy et al.
(Continued)

FOREIGN PATENT DOCUMENTS

WO 2010141429 12/2010

OTHER PUBLICATIONS

Savia et al., "Metadata Based Matching of Documents and Use Profiles", Proc. 8th Finnish Artificial Conference, Human & Artificial Information Processing, pp. 61-69, 1998.

*Primary Examiner* — Yicun Wu
(74) *Attorney, Agent, or Firm* — Scully, Scott, Murphy & Presser, P.C.; Robert Shatto, Esq.

(57) ABSTRACT

Alternative search queries are provided by: determining alternative search paths for terms in a current search query; receiving a user selection of one or more terms in the current search query; providing a graphical display of one or more alternative search paths for the selected terms; receiving a user selection of at least a portion of one of the alternative searchpaths to be a new search query; and displaying search results for the new search query. The new search query may then become the current search query, and the determining of the alternative search paths, the receiving of the user selection of the one or more terms in the current search query, and the providing of the graphical display of alternative search paths for the selected terms are performed for the new search query as the current search query.

18 Claims, 6 Drawing Sheets

(51) Int. Cl.
*G06F 16/332* (2019.01)
*G06F 3/0484* (2013.01)
*G06F 3/0481* (2013.01)

(58) Field of Classification Search
CPC ............ G06F 16/3347; G06F 16/2246; G06F 16/24534; G06F 16/3329; G06F 17/277; G06F 19/34
See application file for complete search history.

(56) References Cited

U.S. PATENT DOCUMENTS

| | | |
|---|---|---|
| 6,671,681 B1 | 12/2003 | Emens et al. |
| 7,072,888 B1 | 7/2006 | Perkins |
| 7,747,639 B2 | 6/2010 | Kasperski et al. |
| 7,996,398 B2 | 8/2011 | Ortega et al. |
| 8,195,683 B2 | 6/2012 | Bolivar |
| 8,498,974 B1 | 7/2013 | Kim et al. |
| 2002/0161752 A1 | 10/2002 | Hutchison |
| 2002/0174119 A1 | 11/2002 | Kummamuru et al. |
| 2006/0248078 A1 | 11/2006 | Gross et al. |
| 2008/0016040 A1 | 1/2008 | Jones et al. |
| 2008/0222143 A1 | 9/2008 | Backer et al. |
| 2009/0094224 A1 | 4/2009 | Richet et al. |
| 2009/0228482 A1 | 9/2009 | Ye |
| 2010/0082634 A1 | 4/2010 | Leban |
| 2011/0295720 A1 | 12/2011 | Parikh et al. |
| 2013/0006957 A1 | 1/2013 | Huang |
| 2015/0012527 A1 | 1/2015 | Hewitt et al. |

USER INTERFACE FOR RECOMMENDED ALTERNATIVE SEARCH QUERIES

CROSS REFERENCE TO RELATED APPLICATION

This application is a continuation application of copending application Ser. No. 13/936,151, filed Jul. 6, 2013, the entire contents and disclosure of which are hereby incorporated herein by reference in their entireties.

BACKGROUND

Keyword searches using a search engine are common today. When a search engine does not return the desired results, users often have to guess what other alternative search terms or words queries they may use to render the desired search results. For example, a user may have a problem with his computer and has done a number of searches on a searchengine using various combinations of terms but is unable to find the solution the user seeks. As the user enters the keyword(s), the search engine displays some alternative search terms using a "type ahead" feature. However, the search engine offers no or very little other information concerning these alternative search terms. Thus, the user again has to guess which alternative search term(s) may lead to the desired search results.

SUMMARY

According to one embodiment of the present invention, a computer implemented method for providing a user interface for recommending alternative search queries determines one or more alternative search paths for one or more terms in a current search query, receives a user selection of one or more terms in the current search query; provides a graphical display of one or more alternative search paths for the selected terms, receives a user selection of at least a portion of one of the alternative search paths to be a new search query, and displays search results for the new search query.

System and computer program products corresponding to the above-summarized methods are also described and claimed herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java, and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified local function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Embodiments according to the present invention expand on the capabilities within the user interface of search engines to enable users to render alternate search queries that could lead them to the information that they are seeking. The user may select one or multiple terms within the search query to initiate an alternate query. A processing engine compares the current search query against historical search data and search analytics data to provide an output of alternative search paths in the user interface. The processing engine further renders a user interface to provide a visual of the alternative paths of search terms related to the search query. The user selects an alternative search query by navigating the alternative search paths displayed on the user interface. Optionally, the user may be provided the ability to customize the display of the alternatives search paths.

Figure 1:
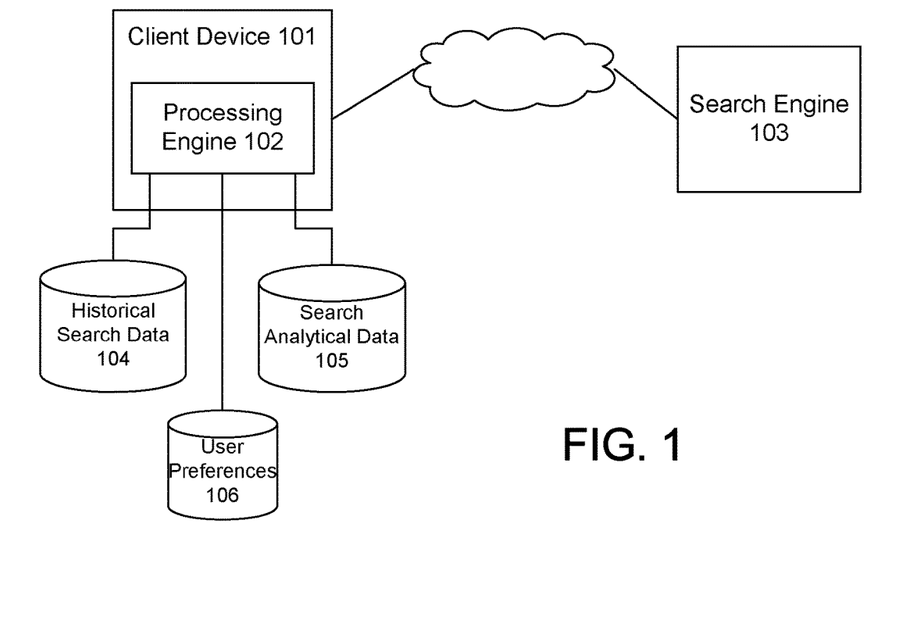
FIG. 1 illustrates an embodiment of a system for providing a user interface for recommending alternative search queries according to the present invention.

FIG. 1 illustrates an embodiment of a system for providing a user interface for recommending alternative search queries according to the present invention. The system includes a client device 101 with access to a processing engine 102 that provides alternative search paths for a search query according to the present invention. The processing engine 102 works in conjunction with a search engine 103 typically provided over a network, such as the Internet. The processing engine 102 may be implemented in different ways, including but not limited to a client side application, built into the search engine 103, or on the server side with privileges to access data on the client device 101. The processing engine 102 has access to historical search data 104 and search analytical data 105 in determining the alternative search paths, as described further below. The processing engine 102 further has access to any user preferences 106 for customizing the display of alternative search paths.

Figure 2:
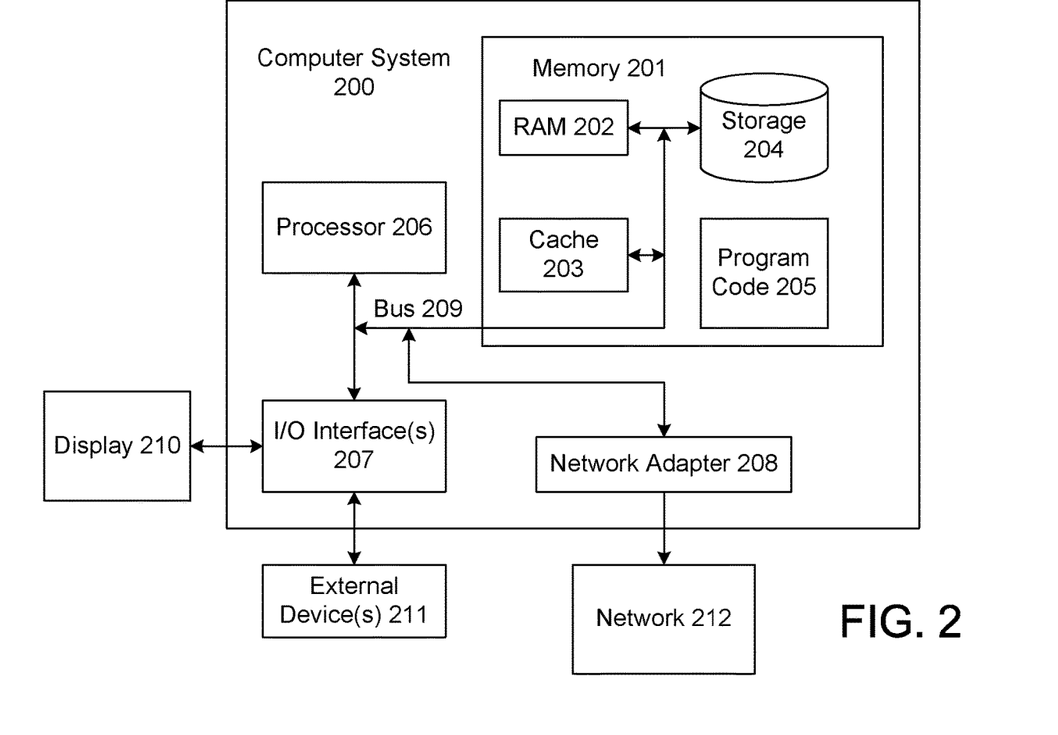
FIG. 2 illustrates an embodiment of a client device according to the present invention.

FIG. 2 illustrates an embodiment of a client device according to the present invention. The client device 100 includes a computer system 200 operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiments of the present invention when executed by the processor 206. The computer system 200 may also communicate with one or more external devices 211, such as a display 210, via I/O interfaces 207. The computer system 200 may communicate with one or more networks 212 via network adapter 208.

Figure 3:
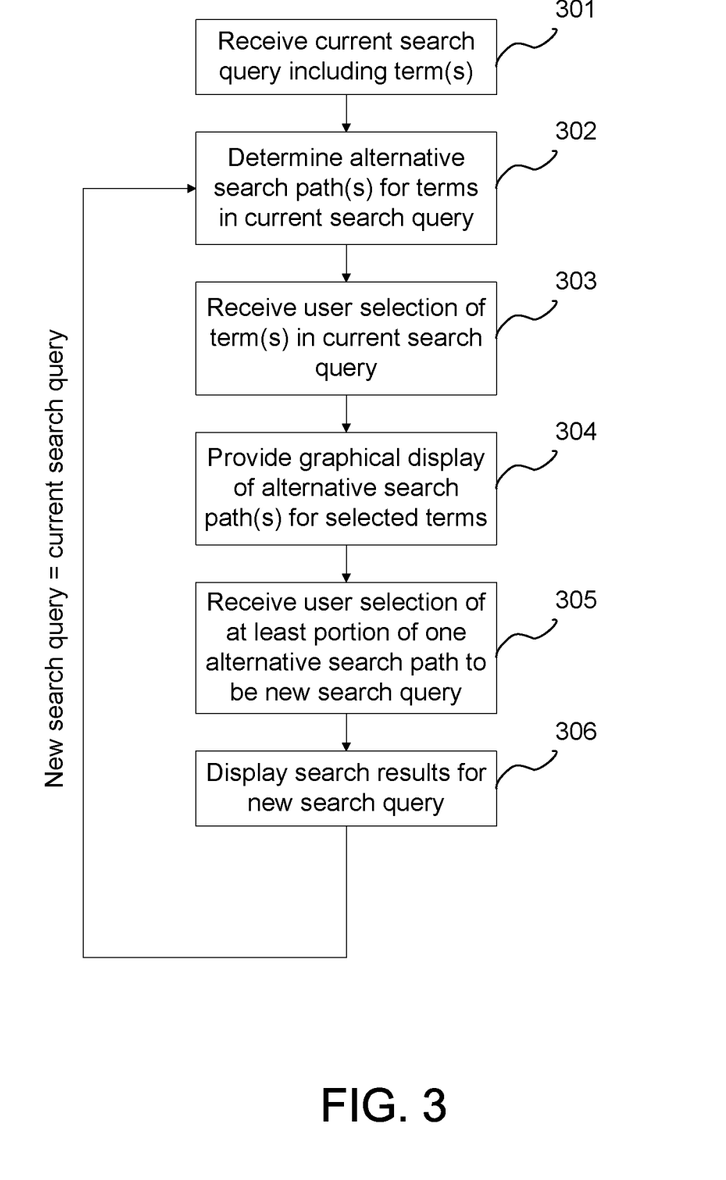
FIG. 3 is a flowchart illustrating an embodiment of a method for providing a user interface for recommending alternative search queries according to the present invention.

FIG. 3 is a flowchart illustrating an embodiment of a method for providing a user interface for recommending alternative search queries according to the present invention. The processing engine 102 receives a current search query, which includes one or more terms, entered by a user of the search engine 103 (301). The processing engine 102 determines one or more alternative search paths for the terms in the current search query (302). In this embodiment, in determining the alternative search paths, the processing engine 102 compares the terms in the current search query against the historical search data 104 and the search analytical data 105. Example historical search data and search analytical data include but is not limited to: alternative results based on the user's historical searches; historical search results data or analytics gathers from other users to recommend additional or alternative words; and alternative variances for the search terms. At some point in time, the processing engine 102 receives a user selection of one or more of the terms in the current search query (303). For example, the user makes the selection after determining that the current search query does not return the desired results. In response, the processing engine 102 provides a graphical display of the alternative search paths for the selected terms within the search engine user interface (304). The graphical display includes graphical elements corresponding to alternative search terms which provide the user with a visual of different paths of search terms that may lead to a more desirable search result. The graphical display may be rendered in many different ways that allow the user to navigate the alternative search paths and to select at least a portion of one of the paths to be the new search query, as described further below. Default display structure and display settings may be used, which may be customized via the user preferences 106. In response to receiving the user selection of at least a portion of one of the paths (305), the processing engine 102 submits this new search query to the search engine 103, which returns a result of the new search. The processing engine 102 then displays the search results for the new search query (306). In this embodiment, the processing engine 102 may again determine alternative search paths for the new search query as the current search query, and the process (302-306) may then be repeated. In this manner, the user may hone the search in an iterative manner until the desired search results are obtained.

Figure 4A:
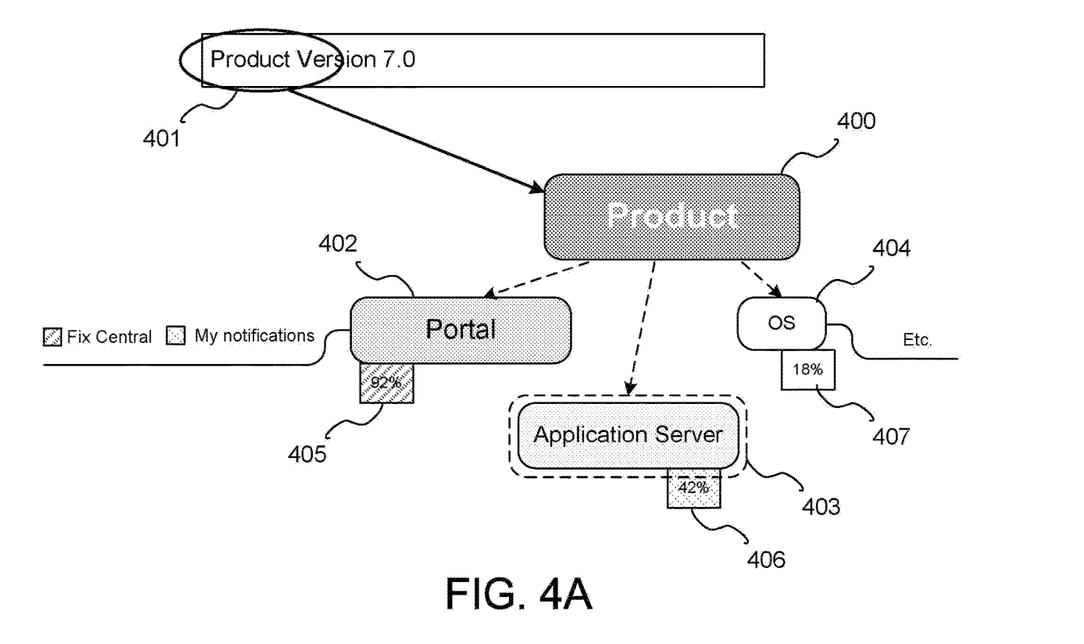
FIGS. 4A-4D illustrate example graphical displays on the user interface according to embodiments of the present invention.
Figure 4B:
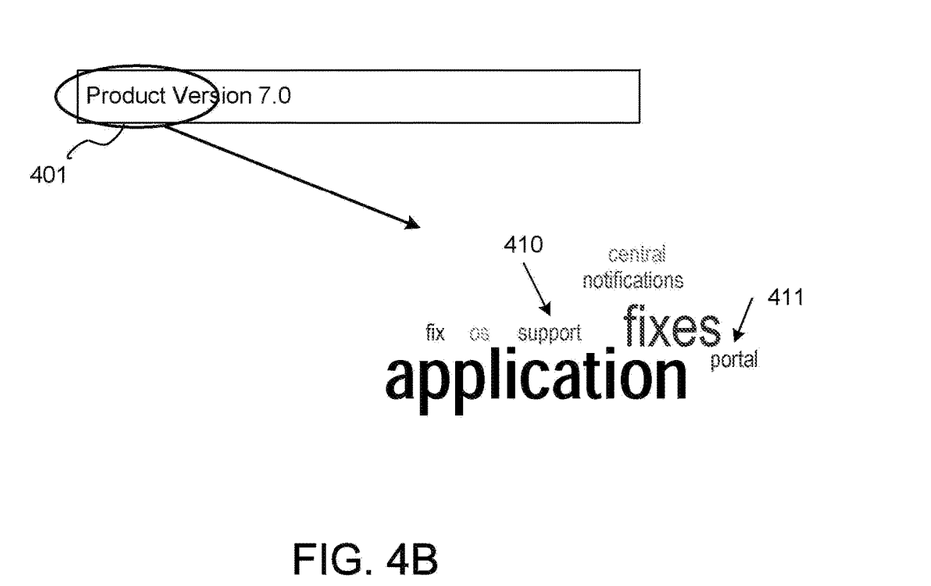
Figure 4C:
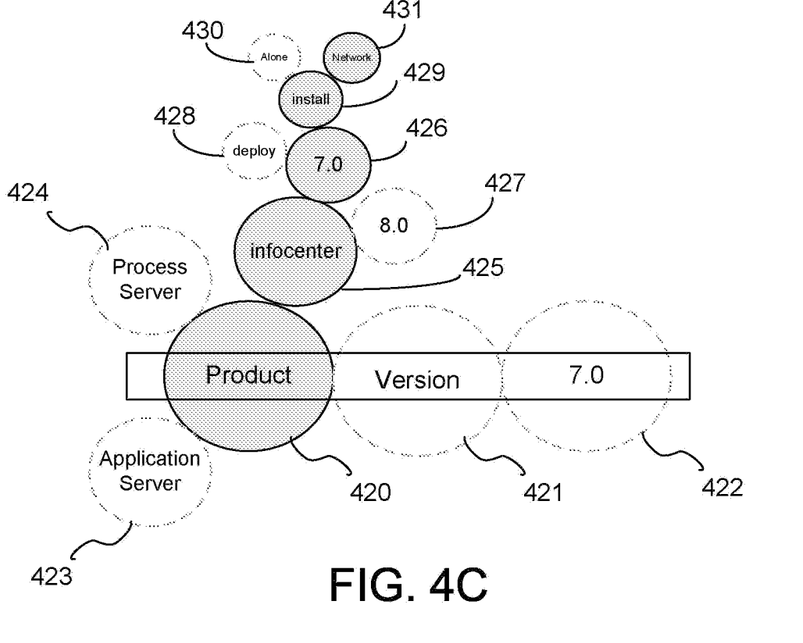
Figure 4D:
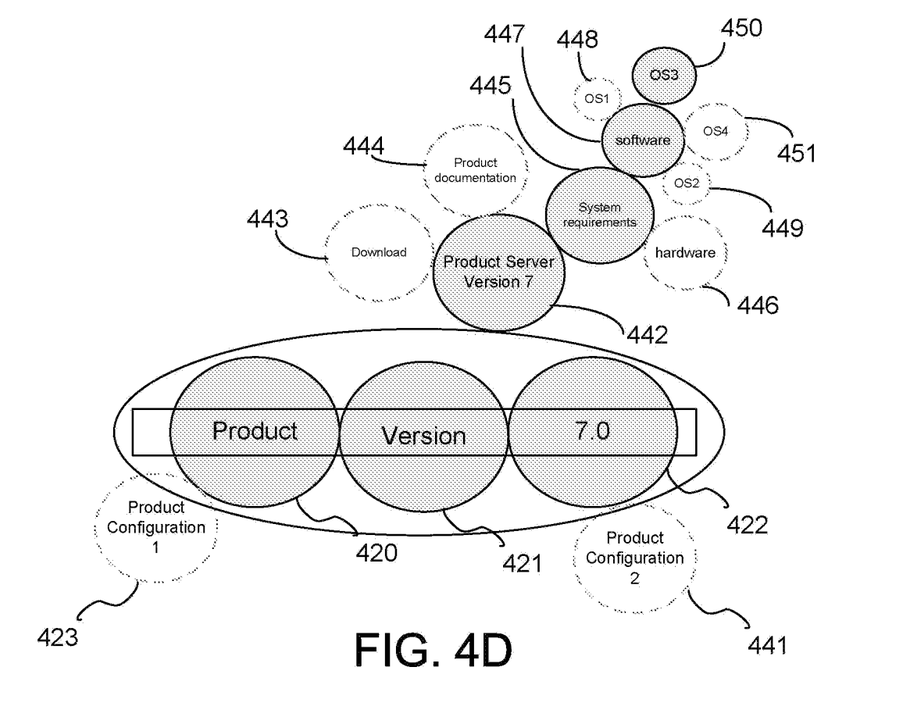

FIGS. 4A-4D illustrate example graphical displays on the user interface according to embodiments of the present invention. FIG. 4A illustrates a hierarchical or decision tree example. FIG. 4B illustrates a word cloud example. FIGS. 4C-4D illustrate bubble examples. Referring to FIG. 4A, assume that the user enters "Product Version 7.0" as the current search query. In response to receiving this current search query (301), the processing engine 102 determines the alternative search paths for the terms in the current search query (302). Assume that the user selects the term "Product" 401. In response to receiving the selection of "Product" 401 (303), the processing engine 102 provides a hierarchical or decision tree of the alternative search paths for "Product" (304). In this example, the paths are illustrated as branches that include "Support Portal" 402, "Application Server" 403, and "OS" 404. The position and size of the words in the paths indicate the likelihood of interest, for example, with the words that are larger and/or closer to the term "Product" 400 indicating a higher likelihood of interest. Optionally, based on the user preferences 106, the processing engine 102 may render different colors (represented by different shadings) and percentages 405-407 of confidence of each alternative term based on the estimation by the processing engine 102 that the path being suggested would be of interest to the user. To select a new search path, the user navigates the tree and selects the path from "Product" 400 to "Support Portal" 402 by clicking on the graphical display of the terms with a mouse, touching the display of the terms with a finger or stylus on a touch screen, tracing a path from the display of "Product" 400 to the display of "Support Portal" 402 on the touch screen using a swipe gesture, hovering over the terms in the path, or by voice commands. Upon receiving the selection of the "Product" to "Support Portal" search path (305), the processing engine 102 displays the search results (not shown) for the new search query of "Product Support Portal" (306). In this example, the processing engine 102 may again determine alternative search paths for the "Product Support Portal" as the current search query, and the process (302-306) may then be repeated.

Referring to FIG. 4B, assume that in response to receiving the selection of "Product" 401 (303), the processing engine 102 provides a word cloud of the alternative search paths for "Product" (304). In this example, the paths are illustrated as a cloud of alternative terms of varying sizes, positions, and/or colors (represented by differing shades). For example, based on the user preferences 106, the color (represented by differing shades) depicts the likelihood of interest, and the size of the word depicts the number of previous searches from other users based on historical and analytical data and/or the likelihood that is would be of interest to the user. The user may then select a path including "support" 410 and "portal" 411 among the terms in the word cloud to be the new search path. The different manners of selection as described above with FIG. 4A may be used here as well. Upon receiving the selection of the "support portal" search path (305), the processing engine 102 displays the search results (not shown) for the new search query of "Product Support Portal" (306). In this example, the processing engine 102 may again determine alternative search paths for the "Product Support Portal" as the current search query, and the process (302-306) may then be repeated.

Referring to FIG. 4C, assume that each term in the current search query are displayed in a separate bubble. In this example, "Product", "Version", and "7.0" are displayed in separate bubbles 420-422. In response to receiving the selection of "Product" bubble 420 (303), the processing engine 102 provides additional bubbles extending from the "Product" bubble 420 that display alternative search paths for "Product" (304). The bubbles are illustrated in varying sizes, positions, and/or colors (represented by differing shades). For example, based on the user preferences 106, the size of the bubble may depict the number of previous searches from other users based on the historical and analytical data and/or the likelihood that it would be of interest to the user. In this example, the bubbles are displayed in a hierarchical or tree structure, with the bubble sizes being smaller with each level of sub-branches in the hierarchy. Here, the "Product" bubble 420 has three sub-bubbles: "Application Server" 423; Process Server" 424; and "infocenter" 425. The "infocenter" bubble 425 has two sub-bubbles: "7.0" 426 and "8.0" 427. The "7.0" bubble 426 has two sub-bubbles: "deploy" 428 and "install" 429. The "install" bubble 429 has two sub-bubbles: "Alone" 430 and "Network" 431. The user may then select a path of bubbles to indicate the terms to be the new search path. Illustrated in this example, the user selects the bubbles for "Product infocenter 7.0 install Network" as the new search path. The different manners of selection as described above with FIG. 4A may be used here as well. Upon selection, the bubbles in the selected path are displayed with a different color or shading than the non-selected bubbles, per the user preferences 106. Optionally, other graphical displays may be added to provide additional information. For example, the bubbles may be color coded to indicate the likelihood of relevancy.

In this embodiment, one or more levels of sub-bubbles are displayed as the user navigates to a bubble. When the user navigates to a bubble, the display of the bubble may be changed to reflect the navigation, such as by a color change. For example, the processing engine 102 initially displays the sub-bubbles of the "Product" bubble 420, with bubbles "Application Server" 423, "Process Server" 424, and "infocenter" 427 only. Upon the user's navigation to the "infocenter" bubble 425, the processing engine 102 displays the sub-bubbles "7.0" 426 and "8.0" 427. If the user had navigated to the "Application Server" bubble 423 instead of or backtracking from the "infocenter" bubble 425, the sub-bubble(s) of the "Application Server" bubble 423 (not shown), would be displayed.

Alternatively, multiple levels of bubbles may be displayed based on a user profile or previous searches by the user. For example, upon the selection of the "Product" bubble 420, the processing engine 102 may display the search path from the "infocenter" bubble 425 to the "install" bubble 429. The user could have recently registered the product during installation, as reflected by the user profile. Thus, the processing engine 102 displays this path with a higher priority.

Assume that the processing engine 102 receives the selection of the "Product infocenter 7.0 install Network" search path (305). In response, the processing engine 102 displays the search results (not shown) for the new search query of "Product infocenter 7.0 install Network" (306). In this example, the processing engine 102 may again determine alternative search paths for the "Product infocenter 7.0 install Network" as the current search query, and the process (302-306) may then be repeated.

As in FIG. 4C, FIG. 4D illustrates each term in the current search query being displayed in a separate bubble. However, in FIG. 4D, the user selects multiple terms in the current search query. In this example, assume the user selects "Product Version 7.0", the entire current search query. In response to receiving the selection of "Product Version 7.0" (303), the processing engine 102 provides additional bubbles extending from the selected group of terms that display alternative search paths for "Product Version 7.0" (304). Here, the "Product Version 7.0" bubbles 421-422 have three sub-bubbles: "Product Configuration 1" 440; "Product Configuration 2" 441; and "Product Server Version 7" 442. The "Product Server Version 7" bubble 442 has three sub-bubbles: "Download" 443; "Product documentation" 444; and "System requirements" 445. The "System requirements" bubble has two sub-bubbles: "hardware" 446 and "software" 447. The "software" bubble 447 has four sub-bubbles: "OS1" 448; "OS2" 449; "OS3" 450; and "OS4" 451. The user may then select a path of bubbles to indicate the terms to be the new search path. Illustrated in this example, the user selects the bubbles for "Product Server Version 7 System requirements software OS3" as the new search path. The different manners of selection as described above with FIG. 4A may be used here as well. The bubbles in the selected path are displayed with a different color or shading than the non-selected bubbles, per the user preferences 106. Optionally, other graphical displays may be added to provide additional information. For example, the bubbles may be color coded to indicate the likelihood of relevancy.

Upon receiving the selection of "Product Server Version 7 System requirements software OS3" search path (305), the processing engine 102 displays the search results (not shown) for the new search query of "Product Server Version 7 System requirements software OS3" (306). In this example, the processing engine 102 may again determine alternative search paths for the "Product Server Version 7 System requirements software OS3" as the current search query, and the process (302-306) may then be repeated. As illustrated in FIGS. 4C-4D, the selection of multiple terms in the search query may lead to different alternative search paths than when a single search term is selected.

Figure 5A:
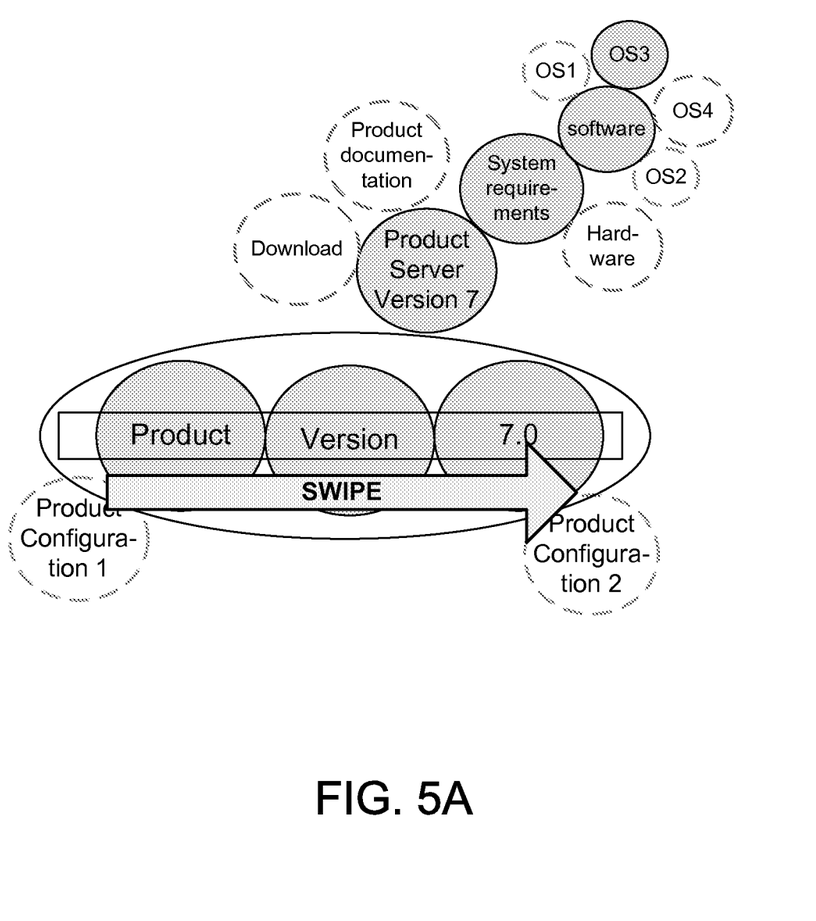
FIGS. 5A-5C illustrate examples of user navigation of alternate search paths on a touch screen according to embodiments of the present invention.
Figure 5B:
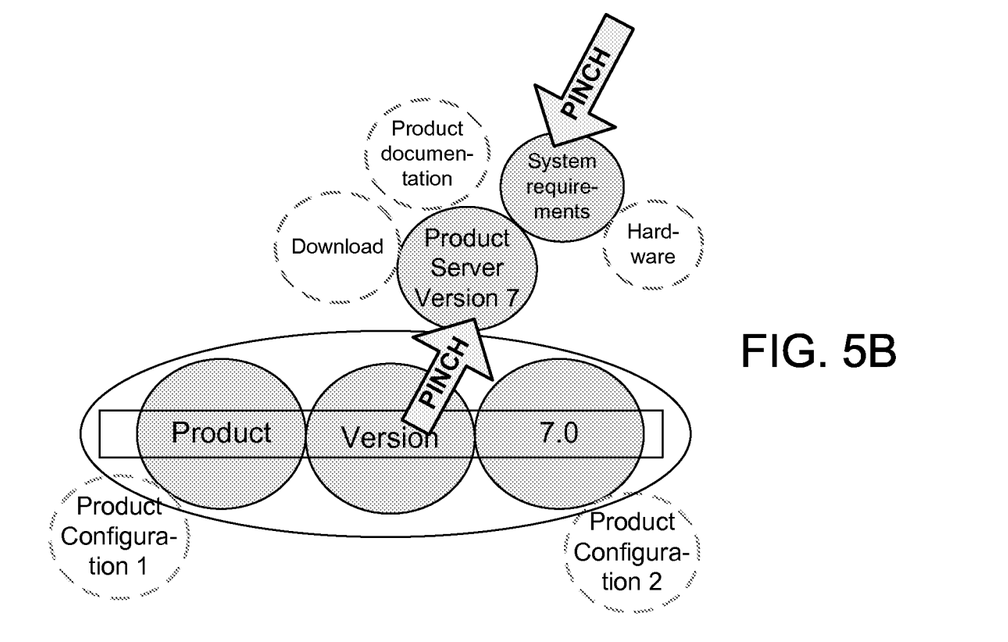
Figure 5C:
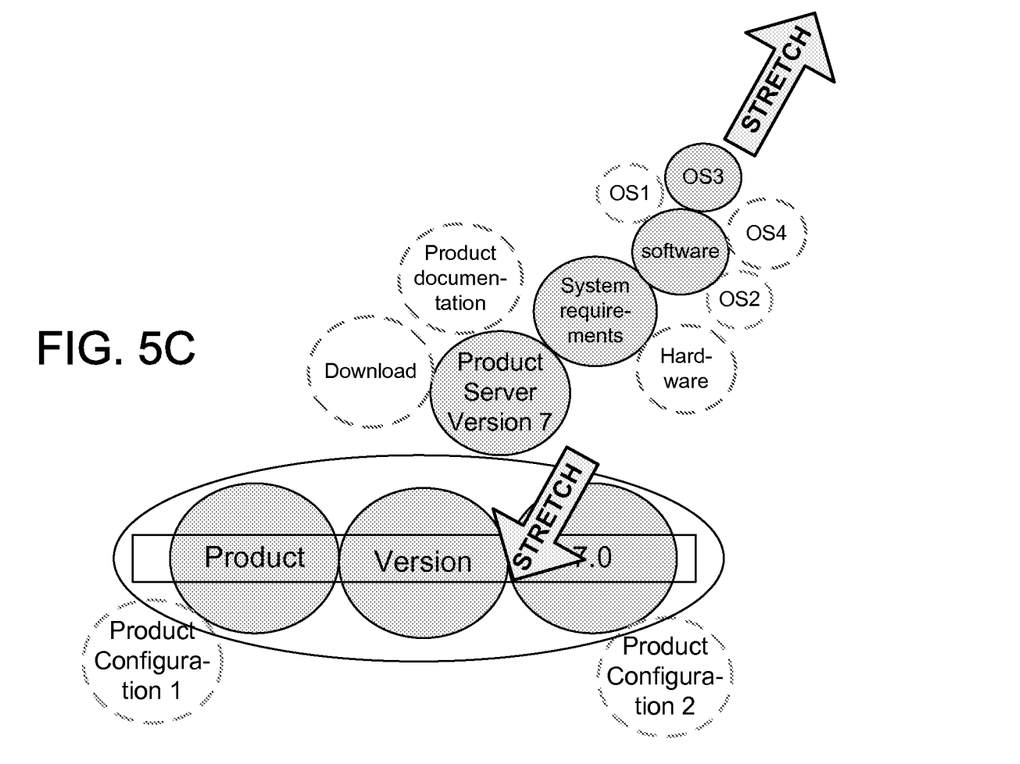

FIGS. 5A-5C illustrate examples of user navigation of alternate search paths on a touchscreen according to embodiments of the present invention. FIG. 5A illustrates the user selecting multiple search terms using a "swipe" gesture across all three bubbles for "Product", "Version" and "7.0". FIGS. 5B and 5C illustrate the user controlling the number of levels of sub-bubbles to display using "pinch" or "stretch" gestures for collapsing or expanding, respectively, on a touch screen. For example, as illustrated in FIG. 5B, assume that the processing engine 102 displays the alternative search path from the Product Server Version 7" bubble 442 to the "OS3" bubble 450. The user may initially place one finger on or near the "Product Server 7" bubble 442, place another finger on or near the "OS3" bubble 450, and move the fingers together in a "pinch" gesture. In response, the processing engine 102 changes the graphical display to collapse the search path to display fewer levels. Similarly, as illustrated in FIG. 5C, assume that the processing engine 102 initially display the alternative search path from the "Product Server Version 7" bubble 442 to the "System requirements" bubble 445, the user may place both fingers on or near this path and move the fingers apart in a "stretch" gesture. In response, the processing engine 102 expands the search paths extending to display additional levels of sub-bubbles.

FIGS. 4A-4D and FIGS. 5A-5C are provided for illustrative purposes. Other ways or combination of ways for rending the graphical display of alternative search paths, and/or other ways of navigating the alternative search paths, may be used without departing from the spirit and scope of the present invention.

The descriptions of the various embodiments of the present invention has been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for providing a user interface for recommending alternative search queries comprising:

receiving from a user a search query comprising a plurality of keywords;

receiving a user selection of one of the keywords of the search query by at least one computing processor;

in response to receiving the user selection of one of the keywords of the search query, determining a plurality of alternative search paths for the one of the keywords by the at least one computing processor, each alternative search path comprising a plurality of alternative keywords, including comparing the one or more keywords of the search query against historical search data and search analytical data to determine the plurality of alternative keywords for the selected one of the keywords of the search query;

providing a graphical display of the plurality of alternative search paths, by the at least one computing processor, including illustrating the alternative search paths as a word cloud of the alternative keywords of varying sizes and positions, and wherein the sizes and positions of the alternative keywords in the word cloud are based on a relevance of the alternative keywords to said one of the keywords, receiving a specified user gesture relative to particular ones of the alternative keywords in the graphical display of the alternative search paths, and in response to receiving the specified user gesture, expanding the graphical display of the alternative search paths to display in the graphical display additional levels of additional alternative keywords;

receiving, by the at least one computing processor, a user selection of a set of the alternative keywords in the graphical display for a new search query, including receiving a user trace of a path on the graphical display through the word cloud of the alternative keywords, said trace identifying a plurality of the alternative keywords for the new search query;

creating the new search query comprising the alternative keywords identified in the traced path by the at least one computing processor; and executing the new search query and displaying search results for the new search query by the at least one computing processor.

2. The method of claim 1, wherein the alternative keywords are shown in varying colors in the word cloud.

3. The method of claim 1, wherein the varying colors of the keywords in the word cloud are based on user preferences.

4. The method of claim 1, wherein the alternative keywords are shown at different levels in the word cloud.

5. The method of claim 1, wherein each alternative search path for the keyword is based on one or more of: historical search data for the user; and search analytical data of other users' searches.

6. The method of claim 1, wherein the graphical display comprises graphical elements corresponding to the alternative keywords in the plurality of alternative search paths, wherein the graphical elements comprise one or more of: varying sizes, shades, colors, and text indicating additional information for the corresponding alternative keyword.

7. The method of claim 1, wherein additional alternative search paths are displayed based on user navigation among graphical elements corresponding to the alternative keywords in the plurality of alternative search paths.

8. The method of claim 1, wherein the plurality of alterative search paths are displayed on a touchscreen, wherein additional alternative search paths are displayed in response to user gestures on the touchscreen.

9. The method of claim 1, wherein the receiving of the user selection of the keyword of the plurality of keywords, and the providing of the graphical display of the hierarchy of the alternative keywords in the plurality of alternative search paths, comprise:

receiving a user selection of multiple keywords of the plurality of keywords in the search query; and providing the graphical display of the hierarchy of the alternative keywords in the plurality of alternative search paths for a combination of the multiple keywords.

10. The method according to claim 1, wherein the size of each of the alternative keywords in the word cloud depicts a number of previous searches from other users that include said each alternative keyword based on the historical and analytical data.

11. A computer program product for providing a user interface for recommending alternative search queries, the computer program product comprising a computer readable storage medium having computer readable program code embodied therewith, the program code executable by a processor to:

receive from a user a search query comprising a plurality of keywords;

receive a user selection of one of the keywords of the search query;

in response to receiving the user selection of one of the keywords of the search query, determine a plurality of alternative search paths for the one of the keywords, each alternative search path comprising a plurality of alternative keywords, including comparing the one or more keywords of the search query against historical search data and search analytical data to determine the plurality of alternative keywords for the selected one of the keywords of the search query;

provide a graphical display of the plurality of alternative search paths, including illustrating the alternative search paths as a word cloud of the alternative keywords of varying sizes and positions, and wherein the sizes and positions of the alternative keywords in the word cloud are based on a relevance of the alternative keywords to said one of the keywords, receiving a specified user gesture relative to particular ones of the alternative keywords in the graphical display of the alternative search paths, and in response to receiving the specified user gesture, expanding the graphical display of the alternative search paths to display in the graphical display additional levels of additional alternative keywords;

receive a user selection of a set of the alternative keywords in the graphical display for a new search query, including receiving a user trace of a path on the graphical display through the word cloud of the alternative keywords, said trace identifying a plurality of the alternative keywords for the new search query;

create the new search query comprising the alternative keywords identified in the traced path; and execute the new search query and display search results for the new search query.

12. The computer program product of claim 11, wherein the alternative keywords are shown in varying colors in the word cloud.

13. The computer program product of claim 11, wherein the varying colors of the keywords in the word cloud are based on user preferences.

14. The computer program product of claim 11, wherein the alternative keywords are shown at different levels in the word cloud.

15. A system comprising:

a computer readable storage medium having computer readable program code embodied therewith, the program code executable by the processor to:

receive from a user a search query comprising a plurality of keywords;

receive a user selection of one of the keywords of the search query;

in response to receiving the user selection of one of the keywords of the search query, determine a plurality of alternative search paths for the one of the keywords, each alternative search path comprising alternative keywords, including comparing the one or more keywords of the search query against historical search data and search analytical data to determine the plurality of alternative keywords for the selected one of the keywords of the search query;

provide a graphical display of the plurality of alternative search paths, including     illustrating the alternative search paths as a word cloud of the alternative keywords of varying sizes and positions, and wherein the sizes and positions of the alternative keywords in the word cloud are based on a relevance of the alternative keywords to said one of the keywords,     receiving a specified user gesture relative to particular ones of the alternative keywords in the graphical display of the alternative search paths, and     in response to receiving the specified user gesture, expanding the graphical display of the alternative search paths to display in the graphical display additional levels of additional alternative keywords;

receive a user selection of a set of the alternative keywords in the graphical display for a new search query, including receiving a user trace of a path on the graphical display through the word cloud of the alternative keywords, said trace identifying a plurality of the alternative keywords for the new search query;

create the new search query comprising the alternative keywords identified in the traced path; and execute the new search query and display search results for the new search query.

16. The system of claim 15, wherein the alternative keywords are shown in varying colors in the word cloud.

17. The system of claim 15, wherein the varying colors of the keywords in the word cloud are based on user preferences.

18. The system of claim 15, wherein the alternative keywords are shown at different levels in the word cloud.

* * * * *